United States Patent
Mason et al.

(10) Patent No.: US 7,679,503 B2
(45) Date of Patent: Mar. 16, 2010

(54) AUTO CONNECT VIRTUAL KEYPAD

(75) Inventors: Dean Mason, Plainview, NY (US); Thomas S. Babich, Glen Cove, NY (US); Piotr Romanczyk, Huntington Station, NY (US)

(73) Assignee: Honeywell International Inc., Morristown, NJ (US)

( * ) Notice: Subject to any disclaimer, the term of this patent is extended or adjusted under 35 U.S.C. 154(b) by 383 days.

(21) Appl. No.: 11/705,659

(22) Filed: Feb. 13, 2007

(65) Prior Publication Data

US 2008/0191861 A1 Aug. 14, 2008

(51) Int. Cl.
*G08B 29/00* (2006.01)
(52) U.S. Cl. .................. 340/506; 340/541; 715/773
(58) Field of Classification Search ................ 340/506
See application file for complete search history.

(56) References Cited

U.S. PATENT DOCUMENTS

| | | | |
|---|---|---|---|
| 6,975,220 B1* | 12/2005 | Foodman et al. | 340/531 |
| 7,113,090 B1 | 9/2006 | Saylor et al. | |
| 2004/0123149 A1* | 6/2004 | Tyroler | 713/201 |
| 2005/0216302 A1 | 9/2005 | Raji et al. | |

FOREIGN PATENT DOCUMENTS

WO  WO 00/36812  6/2000

OTHER PUBLICATIONS

European Search Report, mailed Oct. 26, 2009 corresponding to European application No. EP 08 10 1541.

* cited by examiner

*Primary Examiner*—Benjamin C Lee
*Assistant Examiner*—Curtis King
(74) *Attorney, Agent, or Firm*—Husch Blackwell Sanders Welsh & Katz

(57) ABSTRACT

An auto-connect virtual keypad in one aspect allows for automatic notification of events occurring at a security system control panel to a remote consumer device and/or provides remote access to the control panel from a consumer device by providing a virtual keypad interface on the consumer device. The consumer device in one aspect may include a mobile device or desktop.

22 Claims, 2 Drawing Sheets

AUTO CONNECT VIRTUAL KEYPAD

BACKGROUND OF THE INVENTION

1. Field of Invention

The present disclosure generally relates to surveillance systems, and particularly to a virtual keypad for a security system.

2. Description of Related Art

False alarms occur in many security system operations. Most of the times, the end users of the systems are the biggest contributors to the false alarms. For instance, false alarms are generated when a user fails to disarm the alarm within the allowed entry delay time, that is, the time allotted by the security system for a person to enter the area and disarm the alarm before the alarm triggers. This may happen, for example, if a user is unable to get to the physical location where the control panel is installed within the entry delay time, in order to disarm the security system.

In other cases, users cause false alarms by leaving the premises without properly securing the door. For example, if an end user arms the system and leaves the premises without completely securing the entry/exit door, ordinarily this would become a false alarm. That is, at the end of exit delay time, the entry delay time would start and generate an alarm upon expiration.

In other situations, a security system user such as a homeowner sometimes would like to know the status of the security system when he or she is away from home. For example, a user who has left the house may wonder whether he or she has activated the alarm system before leaving, or whether the system is working properly, the kind of information that is typically displayed on a status display of a security system control panel, that for example, a user has mounted on a wall in his or her house. Currently, there are a limited number of options for remotely confirming security status of one's alarm system.

Thus, it is desirable to have an improved system and method for remotely controlling, confirming or accessing a security system control panel device that is typically located at a premise being secured.

BRIEF SUMMARY OF THE INVENTION

A method and system for automatically connecting a virtual keypad are provided. The method in one aspect may include detecting an event occurring at a control panel device associated with a security system securing a premise, determining one or more devices to which to notify that the event has occurred, notifying the one or more devices of the event, and providing a virtual keypad interface to be accessed from the one or more devices, the virtual keypad interface being operable to provide remote control access to the control panel. In another aspect, the step of notifying may include presenting the virtual keypad interface automatically on the one or more devices.

A system for automatically connecting a virtual keypad in one aspect may include a control panel device associated with a security system for securing a premise. The control panel is operable to detect one or more events occurring at the security system. The system may also include a server or the like operable to receive information associated with one or more events occurring at the control panel. The server is further operable to notify one or more remote devices of the event, and to provide remote access from the one or more devices to the control panel device.

In another aspect, a system for automatically connecting a virtual keypad may include a control panel device or the like associated with a security system for securing a premise. Means for relaying information relays information associated with one or more events occurring at the security system and detected at the control panel device. Means for receiving the information notifies one or more remote devices and provides keypad interface to the one or more remote devices. Means for receiving further receives input entered via the keypad interface. The control panel device may receive input, for example, via the means for relaying, and perform one or more operations that control the security system based on the input.

Further features as well as the structure and operation of various embodiments are described in detail below with reference to the accompanying drawings. In the drawings, like reference numbers indicate identical or functionally similar elements.

DETAILED DESCRIPTION OF THE INVENTION

An auto-connect virtual keypad in an exemplary embodiment of the present disclosure provides a security system keypad interface such as those employed on a security system control panel or monitor to consumer devices, so that, for example, a user may access the security system control panel from any such consumer devices, whether at the premise or away from the premise being secured. Such consumer devices may include, but are not limited to, mobile devices such as cellular phones, smart phones, PDAs (personal digital assistants) and the like, personal computers, laptops, desktops, etc.

In one embodiment, virtual keypad interface of the present disclosure may be sent to the devices using WAP (Wireless Application Protocol). Briefly, WAP is an open international standard for applications that use wireless communication. WAP enables access to the Internet from a mobile phone or PDA. Thus, in this embodiment, virtual keypad interface may be communicated to any device, mobile or stationary, that is WAP enabled, for instance, using the Internet. Any other known or will be known communication protocol may be employed to provide a virtual keypad interface to user devices.

Figure 1:
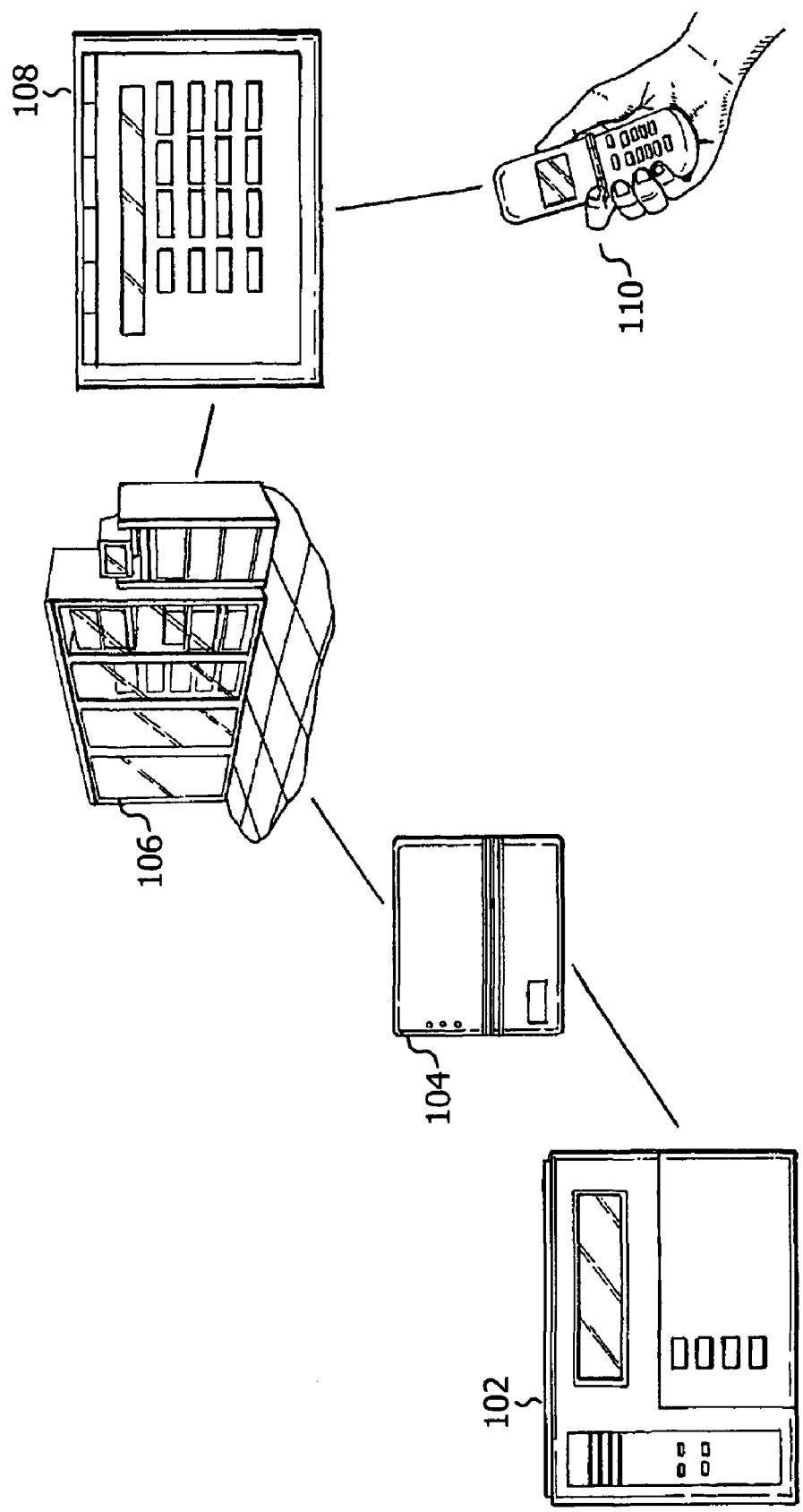
FIG. 1 is a block diagram illustrating the virtual keypad system of the present disclosure in one embodiment.

FIG. 1 illustrates an overview of a virtual key pad system of the present disclosure in one embodiment. Generally, a control panel 102 is a unit that is installed at a premise that is being secured, such as the home or business but not limited to those premises only, and may typically be where the alarm system wiring typically terminates. The control panel 102 may include backup power source such as the backup battery and also may be connected to the phone lines, for instance, for notifying a monitored system when the alarm is activated. The control panel 102 may be used to program the security system and also provide a user interface that presents status of the alarm system at the premise. For instance, the control panel 102 may include a keypad though which a user may arm, disarm or perform other tasks associated with the alarm system. A display or presentation device is typically associated with the control panel 102 that displays or presents alarm status or other information. The control panel 102 may be any known or will be known security control device.

In one embodiment, a communicator device 104 such as an Internet or Global System for Mobile communications (GSM) communicator relays information from the control panel 102 to an alarm network control center 106. In one embodiment, the communicator device 104, for instance, may be a long range radio product that connects to the control panel 102 via private serial communication bus. In another embodiment, it may communicate over serial protocols such as RS485, RS232. Yet in another embodiment, communication between the communicator device 104 and the control panel 102 may occur via Bluetooth or any other short range wireless protocols. When the devices 102 and 104 are physically located on the same premise, any short range communication may be used.

Communication between the communicator device 104 and a central station 106 in one embodiment may utilize long range radio, GPRS/GSM, Ethernet etc. Thus, the communicator device 104 may also have a connection for an RJ45X plug used for connecting to Ethernet LANs (local area networks) or a router that has connection to the Internet, for example, for communicating over the Internet with the alarm network control center 106.

In one embodiment, the communicator device 104, once powered on connects to the alarm network control center 106 and authenticates itself to a server of the alarm network control center 106. Thereafter, the communicator device 104 establishes and maintains the communication with the alarm network control center 106.

Still yet in another embodiment, the communicator 104 need not be a separate device from the control panel. Rather, it is possible to have the functionalities of the communicator or the like integrated with the control panel 102.

The control panel 102 relays output information such as security system operations and changes of status to the communicator device 104. For instance, the output of the control panel may be mapped as a communication packet and transmitted to another device. This type of mapping is referred to as relay emulation. As an example, when an event such as entry delay occurs at the control panel 102, the control panel 102 maps the entry delay into a relay message and sends the message to the communicator device 104. The communicator device 104 in turn sends the message, for example, via the Internet or cellular network, to the alarm network control center 106.

An alarm network control center 106 may be a security system network control center that, for example, houses communication services and hardware platforms for receiving various signals and communications from individual alarm systems installed at customer premises and performing various processings of the alarms and security functions. Upon receiving a communication message from the control panel 102, for instance via the communicator 104 or the like as described above, the alarm network control center 106 notifies a user of the communication from the control panel 102. For example, a server or like functionality at the network control center 106 may determine the source of the message, and map the source to one or more predefined user device addresses to which a notification should be sent. The one or more predefined user devices may have been configured previously, for example, during installation or configuration stage of the user's alarm system. configuration. The network control center 106 then notifies the user on the determined user devices.

The notification may be performed, for example, using e-mail, text messaging, or any other methods. The notification may contain a link to which a user may connect and access a virtual keypad. For instance, the alarm network control center 106 may send an e-mail to a user's device 110 such as a mobile phone. The e-mail may include a link such as URL (Uniform Resource Locator) link that connects to a virtual keypad interface. Thus, for example, a virtual keypad interface 108, which displays the control panel keypad, may be downloaded to the user's device when the user clicks on the link from the user device 110. The user may then using the user device access the security system as if on a control panel, via the virtual keypad interface 108.

In another embodiment, a user may receive a notification from the control center 106 on one user device, and access the virtual keypad interface using another device. For instance, a user may receive a notification through the user's mobile phone but use a laptop or a desktop computer to access the virtual keypad interface.

Yet in another embodiment, the notification may be pushing of the virtual keypad interface on a selected user device. Thus, in this embodiment, a user need not additionally click on a link or perform another operation to access the virtual keypad interface. Rather, the virtual keypad interface is automatically presented to the user on the user device. For example, software application may be provided to run virtual keypad, which may be automatically launched during a device boot and establish communication link with a network center 106. Signal from network center 106 may be routed to the device 110 that runs virtual keypad and cause the virtual keypad to display.

In one embodiment, the data content is sent in "real time" from control panel 102 to the network control center 106, for instance, to the control center's web server, network control server, or the like. In one embodiment, a program such as Java applet or like interprets the data received from the control panel 102. Java applet may be served from a Web Server or Network Control Server. The control panel 102 communicates its data and in one embodiment, the communicator device 104 routes the data between virtual keypad (e.g., Java applet) 108 and the control panel (102). Thus, in one embodiment, private data from private protocol from the control panel 102 becomes available to an application program such as an applet. As noted previously, the functionality of the communicator device 104 may be built into the control panel 104.

Figure 2:
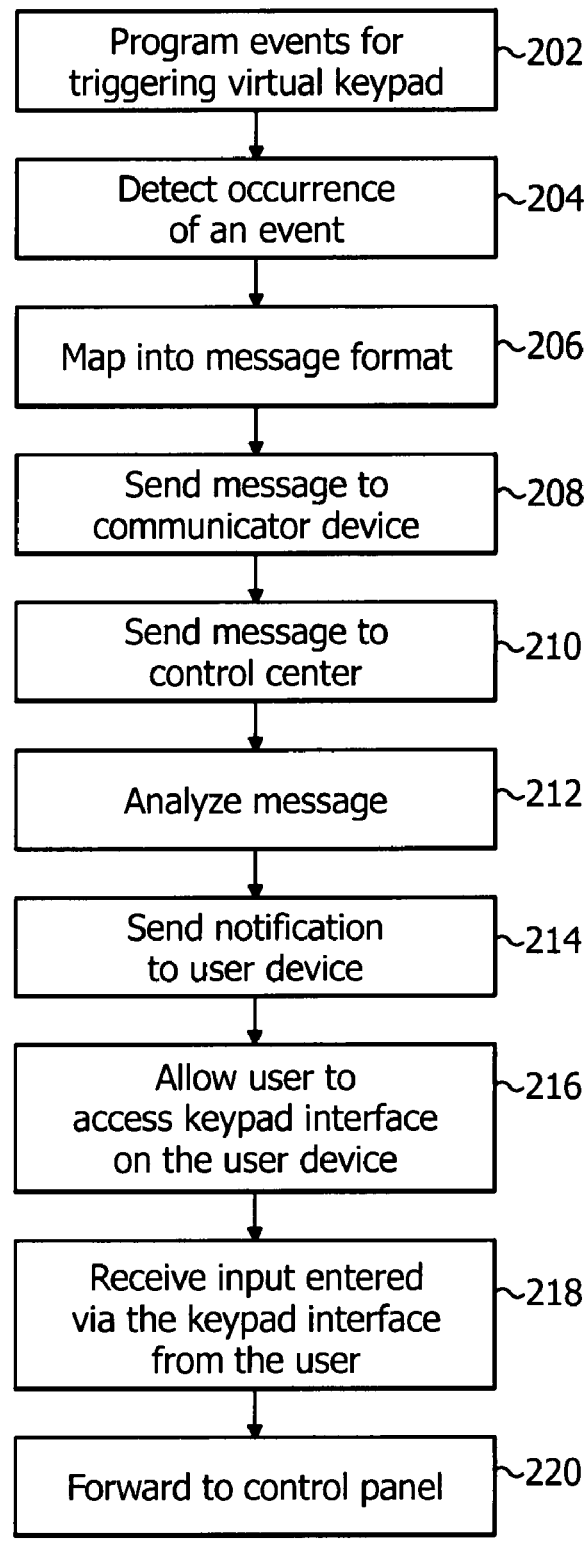
FIG. 2 is a flow diagram illustrating the method steps for automatically connecting to a virtual keypad in one embodiment of the present disclosure.

FIG. 2 is a flow diagram illustrating the method steps for automatically connecting to a virtual keypad in one embodiment of the present disclosure. At 202, events are programmed to trigger the auto-connect virtual keypad. For instance, any event that a user desires to be notified may be programmed using a control panel. A logic or an interrupt in the control panel may then trigger the auto-connect virtual keypad notification sequence as described with reference to FIG. 1, when the control panel detects an occurrence of the one or more programmed events.

Thus, at 204, the security system detects (e.g., at the control panel) an occurrence of one of the events, for which the auto-connect virtual keypad should be triggered. At 206, the event information, which may typically be displayed on the control panel, is mapped into a message format. The control panel at 208 then sends the message to a communicator device. At 210, the communicator device, for example, via its Internet connection sends the message to a security system control center. At 212, the control center analyzes the message, for example, determines the source of the message, and also determines the addresses of one or more devices to notify the occurrence of the event. At 214, the control center sends notification, for example, an e-mail, text messaging, etc., to the one or more devices. The notification may include information or data that tells the user how to access the virtual keypad interface. The notification, for instance, may include a URL (uniform resource locator) link which a user may connect to access the control panel. Selecting the URL link, for example, will download the virtual keypad interface to the user device. The virtual keypad interface, for example, emulates the security system control panel. A user, thus, may access the keypad interface at 216, for example, view the display status of the control panel on the virtual keypad interface. In addition, a user may provide input on the virtual keypad interface at 218 and control the security system remotely from the user device. For example, the user may use the virtual keypad interface to disarm a false alarm that is about to go off. Thus, for instance, a user may be alerted when an event such as entry delay starts and via the virtual keypad, given the opportunity to effectively disarm the system without creating a false alarm.

The input from the user is communicated back to the control panel at 220. For instance, a server such as a web server receiving the input from the URL page of the virtual keypad interface formats the user input into a message that can be communicated over the Internet to the communicator device. The communicator device receives the input from the network control center and transmit the message to the control panel for appropriate processing at the control panel.

As noted above, the functionalities of the communicator device may be integrated into the control panel. Thus, there may not be a need for a separate communicator device for communicating to the network control center.

In another embodiment, a user may access the virtual keypad interface without being notified. For example, a user may connect to the URL link without having notified and download the virtual keypad interface to the user's security system. A server serving the URL link may provide the virtual keypad interface with the latest status information it has stored. In another embodiment, the server may query the control panel 102, for instance, via the communicator device 104, to retrieve the current status information from the control panel 102. In this way, a user may remotely retrieve information regarding a security system and perform keypad operations from a user device.

As noted above, virtual keypad interface may be implemented as java applets, for example, distributed from Web servers or downloaded via any other interface supported on the device 110, such as bluetooth or SD memory but not limited to such. If virtual keypad interface is implemented as java applets, the device for instance would include a "virtual java machine," an operating system component that interprets java applet or the like.

Yet in another embodiment, a control panel may include logic to provide a virtual keypad interface to a user device, without having to route it through a server in a control network. In this embodiment, a control panel may include a server functionality that can download interfaces such as a web-enabled interface to one or more user devices.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed:

1. A method for automatically connecting a virtual keypad, comprising:
    detecting an event occurring at a control panel device associated with a security system securing a premise, the control panel device including a keypad;
    determining one or more devices to which to notify that the event has occurred;
    notifying the one or more devices of the event; and
    downloading a virtual keypad interface to the one or more devices, the virtual keypad interface emulating the control panel device keypad on the one or more devices and the virtual keypad interface being operable from the one or more devices to display status of the control panel and to remotely control the control panel.

2. The method of claim 1, wherein the step of providing a virtual keypad interface includes providing a web interface operable to control the control panel.

3. The method of claim 1, wherein the one or more devices includes a mobile device.

4. The method of claim 1, wherein the one or more devices includes personal computer.

5. The method of claim 1, wherein the step of detecting includes: receiving a message from the control panel device of the event.

6. The method of claim 1, wherein the step of notifying includes: sending an email message to the one or more devices.

7. The method of claim 1, wherein the step of notifying includes: sending a notification message; and sending access to the virtual keypad.

8. The method of claim 1, wherein the step of notifying includes sending a notification with information for accessing the virtual keypad.

9. The method of claim 1, wherein the step of providing a virtual keypad interface includes:
    providing a link for accessing the virtual keypad; and
    allowing downloading of the virtual keypad from the link to the one or more devices.

10. The method of claim 1, further including: receiving keypad input entered on the virtual keypad interface from the one or more devices.

11. The method of claim 10, further including: forwarding the keypad input to the control panel.

12. A system for automatically connecting a virtual keypad, comprising:
    a control panel device associated with a security system for securing a premise, the control panel operable to detect one or more events occurring at the securing system, and the control panel device including a keypad;
    a server operable to receive information associated with the one more events occurring a the control panel, the server further operable to notify one or more remote devices of the event,
    a virtual keypad interface downloaded to the one or more remote devices where a virtual keypad of the virtual keypad interface emulates the control panel keypad, the server further operable to provide remote control of the control panel from the one or more devices via the virtual keypad interface.

13. The system of claim 12, wherein the server is operable to provide the keypad interface on the one or more remote devices, receive input entered through the keypad interface, and forward the input to the control panel.

14. The system of claim 13, wherein the control panel is further operable to perform one or more operations based on the input.

15. The system of claim 13, wherein the keypad interface is a web-enabled keypad interface.

16. The system of claim 12, wherein the one or more remote devices include a mobile device.

17. The system of claim 12, wherein the one or more events are predefined.

18. A system for automatically connecting a virtual keypad, comprising:

a control panel device associated with a security system for securing a premise, the control panel device including a keypad;

means for relaying information associated with one or more events detected at the control panel device, the one or more events associated with a status of the security system;

means for receiving the information and notifying one or more remote devices; and a virtual keypad interface downloaded to the one or more remove devices, the means for receiving providing the virtual keypad interface to the one or more remote devices and receiving input entered via the virtual keypad interface, the virtual keypad interface emulating and remotely controlling the control panel device keypad.

19. The system of claim 18, wherein the means for receiving further forwards the input to the control panel device for performing one or more operations on the security system according to the input.

20. The system of claim 18, wherein the means for relaying is integrated in the control panel device.

21. A method for automatically connecting a virtual keypad, comprising:

detecting an event occurring at a control panel device associated with a security system securing a premise, the control panel device including a keypad;

determining one or more devices to which to notify that the event has occurred; and downloading a virtual keypad interface to the one or more devices, the virtual keypad interface emulating the control panel device keypad;

the virtual keypad interface automatically connecting to a control center of the control panel device; and the virtual keypad interface remotely controlling the control panel.

22. A method for automatically connecting a virtual keypad, comprising:

receiving a request from a device to download to the device, a virtual keypad interface emulating a keypad associated with a control panel securing a premise;

the virtual keypad interface within the device automatically connecting to a control center of the control panel;

querying the control panel;

receiving a current status associated with the control panel; and downloading the virtual keypad interface and displaying the current status associated with the control panel on the device, the virtual keypad interface remotely controlling the control panel.

* * * * *